(12) United States Patent
Martiny, Jr.

(10) Patent No.: US 6,984,906 B1
(45) Date of Patent: Jan. 10, 2006

(54) BEARING CURRENT REDUCTION ASSEMBLY

(75) Inventor: Walter John Martiny, Jr., Ft. Wayne, IN (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/615,425

(22) Filed: Jul. 13, 2000

(51) Int. Cl.
 *H02K 11/00* (2006.01)
 *H02K 5/16* (2006.01)
(52) U.S. Cl. .................... 310/90; 310/67 R; 310/68 R; 310/71
(58) Field of Classification Search .................. 310/90, 310/67 R, 674, 68 R, 71; 384/535; 361/23, 361/33, 42, 221
See application file for complete search history.

(56) References Cited

U.S. PATENT DOCUMENTS

| | | | |
|---|---|---|---|
| 4,267,461 A | * | 5/1981 | Grassmann ................. 307/105 |
| 4,358,695 A | | 11/1982 | MacDonald et al. |
| 4,515,417 A | * | 5/1985 | Shiraishi ..................... 384/445 |
| 4,710,037 A | * | 12/1987 | Newberg ...................... 310/90 |
| 4,793,459 A | * | 12/1988 | Forknall et al. .............. 193/37 |
| 5,726,905 A | | 3/1998 | Yazici et al. |
| 5,804,903 A | * | 9/1998 | Fisher et al. ................ 310/248 |
| 5,821,649 A | | 10/1998 | Langhorst |
| 5,914,547 A | * | 6/1999 | Barahia ....................... 310/90 |
| 6,109,794 A | | 8/2000 | Bertetti et al. |
| 6,133,658 A | * | 10/2000 | Fisher ......................... 310/89 |
| 6,142,673 A | | 11/2000 | Kottritsch et al. |
| 6,608,410 B2 | * | 8/2003 | Sato et al. ................. 310/67 R |

FOREIGN PATENT DOCUMENTS

JP          06-009355    *  2/1994

* cited by examiner

*Primary Examiner*—Burton Mullins
(74) *Attorney, Agent, or Firm*—Armstrong Teasdale LLP

(57) ABSTRACT

An electric motor with an adjustable speed drive includes a bearing current reduction assembly including a charge concentrator providing a higher electric field concentration through a clearance between an inner bearing cap and a rotor shaft than occurs within a bearing. Accordingly, damaging rotor to ground currents through a bearing are reduced or eliminated. The charge concentrator is disposed on either the rotor shaft or the inner bearing cap, or both.

18 Claims, 2 Drawing Sheets

US 6,984,906 B1

BEARING CURRENT REDUCTION ASSEMBLY

BACKGROUND OF THE INVENTION

This invention relates generally to electric motors and, more particularly, to bearing assemblies for electric motors with adjustable speed drives.

A/C electric motors typically include a motor housing, a stator including one or more stator windings, and a rotor assembly. The rotor assembly includes a rotor core and a rotor shaft extending through the rotor core. The motor housing includes at least one endshield and houses at least a portion of the rotor assembly. Electric motors also typically include at least one bearing sized to receive and support the rotor shaft, and at least one inner bearing cap separated from the bearing. Typically, the bearing is positioned between an endshield and an inner bearing cap and facilitates rotation of the rotor shaft when the stator windings are energized. An adjustable speed drive circuit is coupled to an inverter and the motor to selectively vary the motor speed as desired in a particular application.

Improvements in inverter technology have led to increased use of adjustable speed drives with A/C induction motors. High speed switching of power supplied to these motors often results in charge build up between the rotor and the stator until a sparking voltage develops across the bearing. Once a sparking voltage develops, a spark discharges across the bearing. After the initial spark, a capacitive coupling between the rotor and stator provide a damaging "follow on" current through the bearing. This current damages the bearing thus affecting motor reliability and performance. Insulated bearings, shaft brushes, and modified drive circuits have been employed to reduce and/or eliminate damaging current flow through the bearings, but tend to increase the cost of the motor, reduce motor performance, or introduce costly maintenance issues.

Accordingly, it would be desirable to provide a low cost bearing assembly that reduces or eliminates current flow through the bearings to improve motor reliability and performance while avoiding costly maintenance issues.

BRIEF SUMMARY OF THE INVENTION

In an exemplary embodiment of the invention, a bearing current reduction assembly includes a rotor shaft, an inner bearing cap having an inner end, and a charge concentrator disposed on either the rotor shaft or the inner end, or both. The inner bearing cap is substantially radially aligned with the rotor shaft. The inner end is in close proximity to the rotor shaft and separated from the rotor shaft by a clearance.

The charge concentrator concentrates electrical charge to produce a higher electrical field concentration through the clearance than occurs within a bearing. Accordingly, during operation of an induction motor with an adjustable speed drive, charge build up between the rotor shaft and a stator discharges at the charge concentrator instead of within a bearing. More specifically, rotor to stator currents through the bearings are reduced or eliminated.

Accordingly, the bearing current reduction assembly provides a low cost bearing assembly that reduces or eliminates current flow through the bearings to improve motor reliability and performance while avoiding costly maintenance issues.

DETAILED DESCRIPTION OF THE INVENTION

Figure 1:
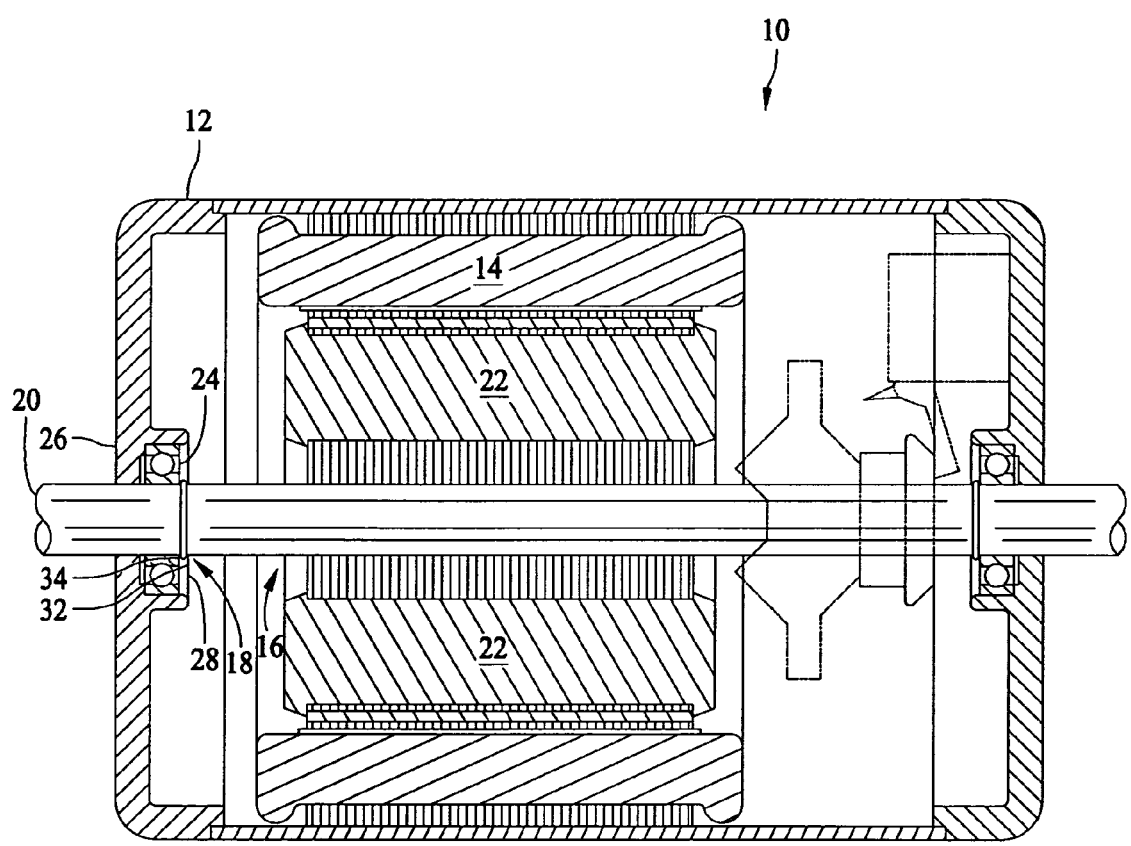
FIG. 1 is a cross-sectional view of a motor assembly including a bearing current reduction assembly.

FIG. 1 is a cross-sectional view of a motor assembly 10 including a motor housing 12, a stator 14 having a plurality of windings, a rotor assembly 16 and a bearing current reduction assembly 18. Rotor assembly 16 includes a rotor shaft 20 mounted on a rotor core 22. A bearing 24 is positioned between an endshield 26 and an inner bearing cap 28.

Energizing the stator windings with alternating current produces a changing magnetic field or flux within rotor core 22 causing rotor shaft 20 to rotate. The angular velocity of rotor shaft 20 is partially a function of the power delivered to motor assembly 10. Typically, an adjustable speed drive circuit (not shown) is coupled to an inverter (not shown) and motor assembly 10 to vary an angular velocity of rotor shaft 20. High speed switching of power supplied to motor assembly 10 often produces a charge build up between rotor shaft 20 and stator 14.

Bearing current reduction assembly 18 provides an electrical path from rotor shaft 20 to stator 14 that does not include bearing 24. Accordingly, damaging rotor to stator currents through bearing 24 are reduced or eliminated. Although, an exemplary embodiment is described in the context of a motor having an adjustable speed drive, it is contemplated that the benefits of the invention accrue to a wide variety of motors for various applications and controlled by alternative drive circuits.

Figure 2:
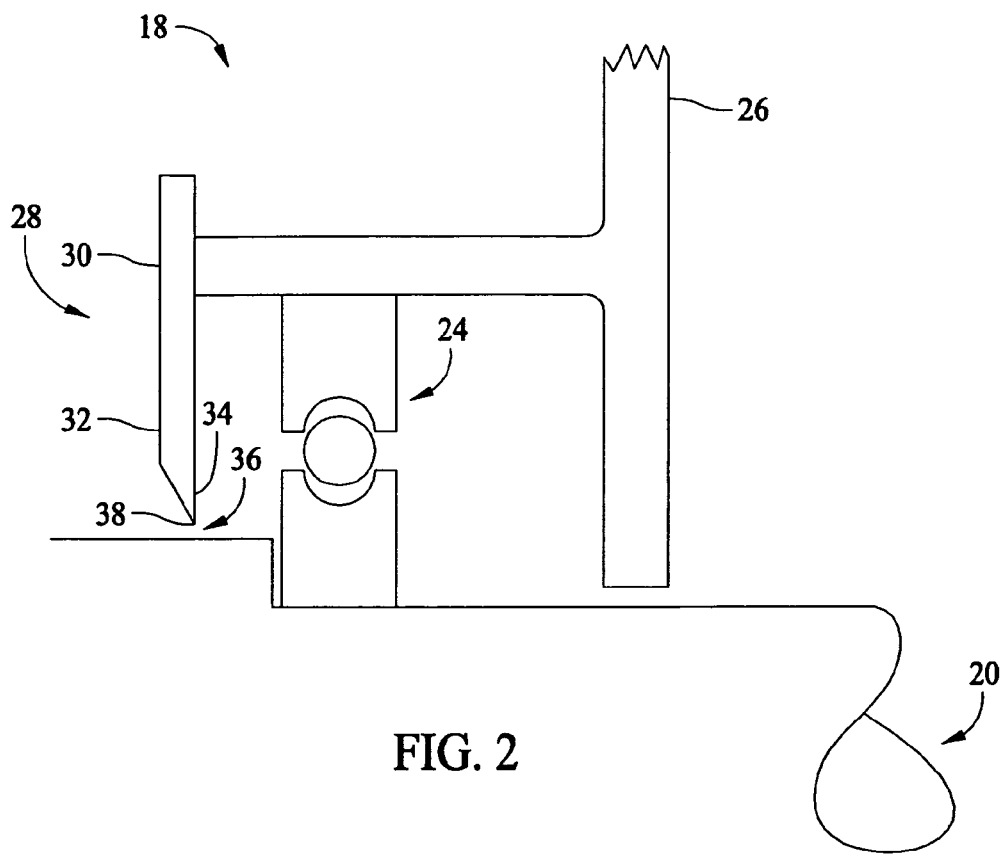
FIG. 2 is a schematic view of the bearing current reduction assembly shown in FIG. 1.

FIG. 2 is a schematic view of bearing current reduction assembly 18 (shown in FIG. 1) including an inner bearing cap 28 substantially radially aligned with rotor shaft 20 and having an outer end 30 and an inner end 32. Inner end 32 includes bearing cap charge concentrator 34 in close proximity with rotor shaft 20 and separated from rotor shaft 20 by a clearance 36. In an exemplary embodiment, clearance 36 is approximately 0.005 inch to provide adequate shaft clearance while facilitating current flow from rotor shaft 20 to stator 14. In an alternative embodiment, clearance 36 is greater or lesser than 0.005 inch. Bearing 24 is positioned between inner bearing cap 28 and endshield 26.

During operation, a charge build up between rotor shaft 20 and stator 14 (as shown in FIG. 1) concentrates at bearing cap charge concentrator 34 providing a higher electrical field concentration through clearance 36 than an electrical field concentration through bearing 24. Accordingly, charge build up bleeds off or discharges, flowing through clearance 36 instead of through bearing 24. Thus, damaging current flow through bearing 24 is reduced or eliminated.

In an exemplary embodiment, inner end 32 is machined to provide a sharp edge 38 facing rotor shaft 20 such that sharp edge 38 has a small radius to concentrate charge. Inner bearing cap 28 is fabricated from a suitable electrically conducting material. In an exemplary embodiment, inner bearing cap 28 is made of aluminum alloy 850.00.

Figure 3:
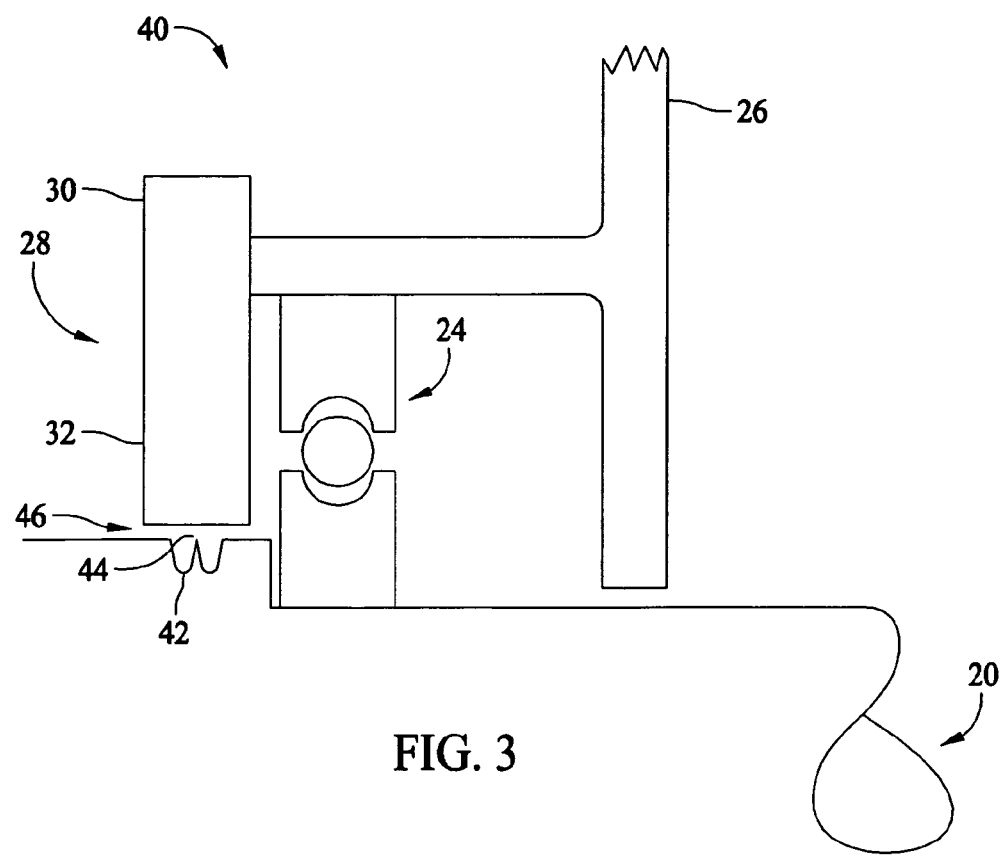
FIG. 3 is a schematic view of a second embodiment of a bearing current reduction assembly.

FIG. 3 is a schematic of another exemplary embodiment of a bearing current reduction assembly 40, similar to bearing current reduction assembly 18, including an inner bearing cap 28 having an outer end 30 and an inner end 32. Rotor shaft 20 includes a rotor charge concentrator 42 in close proximity to bearing cap 28 and separated from bearing cap 28 by a clearance 46. In an exemplary embodiment, clearance 46 is approximately 0.005 inch to provide adequate shaft clearance while facilitating current flow from rotor shaft 20 to stator 14. In an alternative embodiment, the clearance between rotor charge concentrator 42 and inner end 32 is greater or lesser than 0.005 inch. Bearing 24 is positioned between inner bearing cap 28 and endshield 26. In one embodiment, rotor shaft 20 is machined with a sharp edge 44 thereon to provide a rotor charge concentrator 42 with a small radius such that the sharp edge 44 concentrates charge.

During operation, a charge build up between rotor shaft 20 and stator 14 (as shown in FIG. 1) concentrates at rotor charge concentrator 42 generating a higher electrical field concentration through clearance 46 than through bearing 24. Accordingly, charge build up bleeds off or discharges, flowing through clearance 46 instead of through bearing 24. Thus, damaging current flow through bearing 24 is reduced or eliminated.

While the invention has been described in terms of various specific embodiments, those skilled in the art will recognize that the invention can be practiced with modification within the spirit and scope of the claims.

What is claimed is:

1. A bearing current reduction assembly comprising:
   a rotor shaft;
   a bearing supporting said rotor shaft;
   an inner bearing cap substantially radially aligned with said rotor shaft, said inner bearing cap comprising an inner end, said inner end in close proximity to said rotor shaft; and
   a charge concentrator positioned between said rotor shaft and said inner end, said charge concentrator comprising a sharp edge and configured to concentrate a charge that bypasses said bearing when said charge concentrator is disposed on said inner end of said inner bearing cap.

2. An assembly according to claim 1 wherein said charge concentrator includes an edge having a small radius to concentrate electrical charge thereon.

3. An assembly according to claim 1 wherein said inner end is within approximately 0.005 inch from said rotor shaft.

4. An assembly according to claim 1 wherein said inner bearing cap comprises an aluminum alloy.

5. An assembly according to claim 1 wherein said inner end comprises said charge concentrator.

6. An electric motor assembly comprising:
   a motor housing;
   a stator mounted in said housing and comprising a bore therethrough;
   a rotor core rotatably mounted in said housing and extending through said stator bore;
   a rotor shaft extending through said rotor core;
   an inner bearing cap radially aligned with said rotor shaft, said inner bearing cap having an inner end and an outer end, said inner end in close proximity to said rotor shaft; and
   a charge concentrator disposed on said rotor shaft, said charge concentrator positioned between said rotor shaft and said inner end, said charge concentrator comprising a sharp edge, said charge concentrator separated from said inner bearing cap by a clearance configured to facilitate a current flow between said rotor shaft and said stator.

7. An electric motor assembly according to claim 6 wherein said charge concentrator includes an edge having a small radius to concentrate electrical charge thereon.

8. An electric motor assembly according to claim 6 wherein said inner end is within approximately 0.005 inch from said rotor shaft.

9. An electric motor assembly according to claim 6 wherein said inner bearing cap comprises an aluminum alloy.

10. An electric motor assembly according to claim 6 wherein said rotor shaft comprises said charge concentrator.

11. An electric motor assembly according to claim 6 further comprising a bearing positioned between said inner bearing cap and an endshield included within said motor housing.

12. A bearing current reduction assembly comprising:
    a rotor shaft;
    a bearing supporting said rotor shaft;
    an inner bearing cap substantially radially aligned with said rotor shaft, said inner bearing cap including an inner end and an outer end, said inner end spaced from said rotor shaft; and
    a charge concentrator extending from said rotor shaft, said charge concentrator including a sharp edge, said charge concentrator separated from said inner bearing cap by a clearance between said charge concentrator and said inner bearing cap, and said clearance configured to facilitate a current flow between said rotor shaft and a stator.

13. A bearing current reduction assembly according to claim 12 wherein said charge concentrator includes a small radius to form said sharp edge.

14. A bearing current reduction assembly according to claim 12 wherein said charge concentrator is configured to generate a higher electrical field concentration through said clearance than through said bearing.

15. A bearing current reduction assembly according to claim 12 wherein said clearance is up to 0.005 inches.

16. A bearing current reduction assembly according to claim 12 wherein said clearance is at least 0.005 inches.

17. A bearing current reduction assembly according to claim 12 wherein said inner bearing cap comprises an aluminum alloy.

18. A bearing current reduction assembly according to claim 12 wherein said rotor shaft comprises said charge concentrator.

\* \* \* \* \*